United States Patent [19]

Mansfield

[11] Patent Number: 5,478,016
[45] Date of Patent: Dec. 26, 1995

[54] VECTORABLE NOZZLE

[75] Inventor: Philip A. Mansfield, Bristol, England

[73] Assignee: Rolls-Royce plc, London, England

[21] Appl. No.: 294,948

[22] Filed: Aug. 24, 1994

[30] Foreign Application Priority Data

Aug. 27, 1993 [GB] United Kingdom .................. 9317876

[51] Int. Cl.⁶ .................................................. B64C 15/00
[52] U.S. Cl. ..................... 239/265.19; 244/12.5
[58] Field of Search ......................... 239/265.11, 265.19, 239/265.25–265.29, 265.33–265.39; 244/12.5, 23 D, 52, 110 B; 60/230, 232, 262, 271

[56] References Cited

U.S. PATENT DOCUMENTS

| | | | |
|---|---|---|---|
| 3,096,954 | 7/1963 | Bauger et al. | 244/23 D |
| 3,380,660 | 4/1968 | Markowski | 239/265.27 |
| 3,490,236 | 1/1970 | Markowski | 239/265.35 X |
| 3,704,829 | 12/1972 | Hall | 239/265.35 |
| 3,835,643 | 9/1974 | DeGarcia, Jr. et al. | 239/265.35 X |
| 4,519,543 | 5/1985 | Szuminski et al. | 239/265.19 |
| 5,123,613 | 6/1992 | Piasecki | 244/52 |

FOREIGN PATENT DOCUMENTS

| | | | |
|---|---|---|---|
| 0118181A | 9/1984 | European Pat. Off. . | |
| 1941573 | 2/1971 | Germany | 244/12.5 |
| 2055586 | 6/1978 | Germany | 244/23 D |
| 920984 | 3/1963 | United Kingdom . | |
| 1339512 | 12/1973 | United Kingdom . | |
| 1350895 | 4/1974 | United Kingdom . | |
| 1370887 | 10/1974 | United Kingdom | 239/265.19 |
| 2163105A | 2/1986 | United Kingdom . | |

*Primary Examiner*—Andres Kashnikow
*Assistant Examiner*—Lesley D. Morris
*Attorney, Agent, or Firm*—Oliff & Berridge

[57] ABSTRACT

A vectorable nozzle for directing the thrust produced by an aircraft mounted lift fan includes three relatively rotatable nozzle sections. A first of the nozzle sections is part toroidal in form, and is mounted for rotation at the downstream end of the fan casing about an axis tangential to the casing periphery. The second and third sections define corresponding scarf nozzle sections which are mounted for rotation about respective axes perpendicular to the exit flow plane of the respective upstream nozzle section.

8 Claims, 1 Drawing Sheet

VECTORABLE NOZZLE

FIELD OF THE INVENTION

This invention relates to a vectorable nozzle for an aircraft powerplant application. In particular, the invention concerns a vectorable nozzle for a vertical take-off and landing (VTOL) aircraft utilizing airframe mounted lift fans to provide vertical thrust.

BACKGROUND OF THE INVENTION

The present invention relates specifically to scarfed nozzles, an example of which can be found in the UK patent GB 2,163,105. In general the scarfed nozzle comprises a pair of relatively rotatable nozzle segments which co-operate to direct engine thrust in selective predetermined directions. Typically the vectoring range of these prior art nozzles is a function of the inclination of the scarfed nozzle plane relative to the nominal nozzle axis, the maximum value of which is fixed for a given nozzle length.

Prior art scarfed nozzles have been used in VTOL aircraft applications which utilize a single jet pipe nozzle to direct engine thrust in selective predetermined direction. In contrast, however, scarfed nozzles have failed to feature in any proposed VTOL aircraft having lift fan units coupled to vectorable nozzles for vertical thrust. The main reason for this has been nozzle stowability. In this type of application it is necessary, for aerodynamic reasons, to locate the lift fan units and associated nozzles within aircraft structure. For aerodynamic reasons also, it is necessary to limit the stowed nozzle length. Consequently, it is not always possible to achieve the required nozzle vectoring range without first compromising the airframe design in accordance with nozzle stowability.

SUMMARY OF THE INVENTION

An object of the present invention is, therefore, to provide an improved scarfed nozzle which has greater stowability characteristics than known prior art designs.

According to the invention there is provided a vectorable nozzle of the kind which includes at least two consecutive scarfed nozzle sections, each rotatably mounted to an adjacent end of a neighboring section in a plane comprising the adjoining ends of said neighboring sections, the improvement comprising:

an additional scarfed nozzle section mounted to a final one of the at least two consecutive sections, and pivotally movable about a laterally displaced transverse axis for selective deployment to increase the vectoring range of the at least two consecutive sections.

BRIEF DESCRIPTION OF THE DRAWINGS

The invention will now be described by way of example only, with reference to the accompanying drawings, in which.

DETAILED DESCRIPTION OF THE PREFERRED EMBODIMENT

Figure 1:
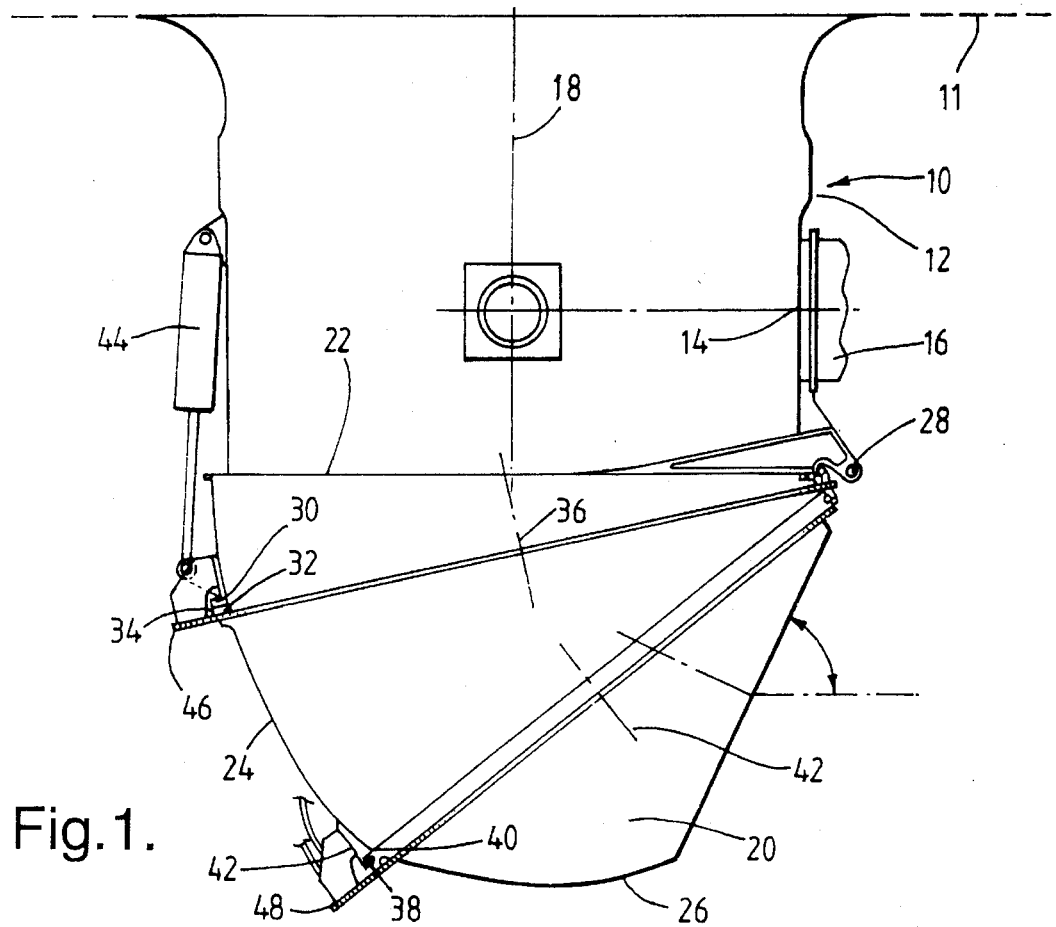
FIG. 1 is a side view of the nozzle of the present invention in its fully deployed configuration.

Referring to FIG. 1, there is shown a shaft driven lift fan 10 mounted in a VTOL airframe structure 11. The lift fan is of generally well known type and includes, a cylindrical casing 12 having an aperture 14 which receives a radial drive shaft 16, and at least one rotor assembly (not shown) disposed coaxially within the casing 12 about longitudinal fan axis 18. Bevel gearing (not shown) is provided internally of the fan casing 12 to transfer the radial input drive through 90 degrees to drive the fan rotor about axis 18.

In use the fan delivery flow exits the fan casing at its downstream end in a plane orthogonal to axis 18, and then discharges to atmosphere by means of a nozzle 20 of the present invention.

As shown, nozzle 20 includes three relatively rotatable nozzle sections 22, 24, 26 arranged in flow series to provide a continuous flow path between the fan casing and nozzle exit.

Collectively the intermediate and downstream nozzle sections 24, 26 define a conventional scarf nozzle which is convergent in the flow direction.

In the embodiment shown the intermediate nozzle section 24 is rotatably mounted to the downstream end of nozzle segment 22 by means of a roller element bearing 30. The inner race of bearing 30 is defined by an annular flange 32 disposed about the downstream periphery of nozzle section 22, and similarly the outer race of bearing 30 is defined by an annular flange 34 disposed about the upstream periphery of nozzle section 24. Accordingly, nozzle section 24 is mounted relative to upstream nozzle segment 22 about an axis 36 orthogonal to the exit flow plane of nozzle segment 22 and coincident with the flow axis in that plane.

The downstream nozzle section 26 is similarly rotatably mounted to the downstream end of nozzle section 24 by means of a roller element bearing 38. The inner race of bearing 38 is defined in a similar manner to that of bearing 30 by means of an annular flange 40 disposed about the upstream periphery of nozzle section 26, and the outer race by means of an annular flange 42 disposed about the downstream periphery of nozzle section 24. Nozzle section 26 is thus rotatable about an axis 42 orthogonal to the exit plane of intermediate nozzle section 24 and coincident with the flow axis in that plane.

The additional upstream section 22 of nozzle 20 comprises a scarfed hollow segment of torus mounted for rotation at the downstream end of the fan casing. Preferably, nozzle segment 22 is mounted about an axis 28 tangential to the casing periphery and coincident with its toroidal axis of revolution. In the embodiment shown, nozzle segment 22 has a cross section diameter greater than that of the fan casing 12 and as such is movable telescopically over the casing. It is to be appreciated of course, that although this configuration is preferable for aerodynamic and sealing reasons, it would be possible to construct a nozzle in accordance with the present invention in which the nozzle segment 22 was movable telescopically within the casing 12.

Moreover, it is to be appreciated that it would be possible to construct a nozzle in accordance with the invention, in which, the scarfed nozzle sections 24, 26 were mounted in conventional manner to the downstream end of fan casing 12, and in which the toroidal segment 22 was mounted to downstream end of the scarfed section 26 for pivotal movement over the downstream end of that nozzle section.

A conventional linear actuator 44 is provided for effecting movement of nozzle segment 22 relative to fan casing 12. As shown actuator 44 is attached at one end to the fan casing 12 at a location diametrically opposite hinge axis 28, and at its other end to nozzle segment 22. Chain drive actuators 46, 48 are further provided for effecting rotation of nozzle sections 24, 26 about their respective axis. Preferably annular chain rings (not shown) are mounted on the respective annular flanges 34, 40 so that bearing loads are evenly distributed during nozzle actuation.

In order to prevent leakage of fan discharge air between the fan outlet and the oversized telescopic nozzle segment 22, outwardly sprung sealing rings (not shown) seated in grooves in fan casing 12 could be provided.

Figure 2:
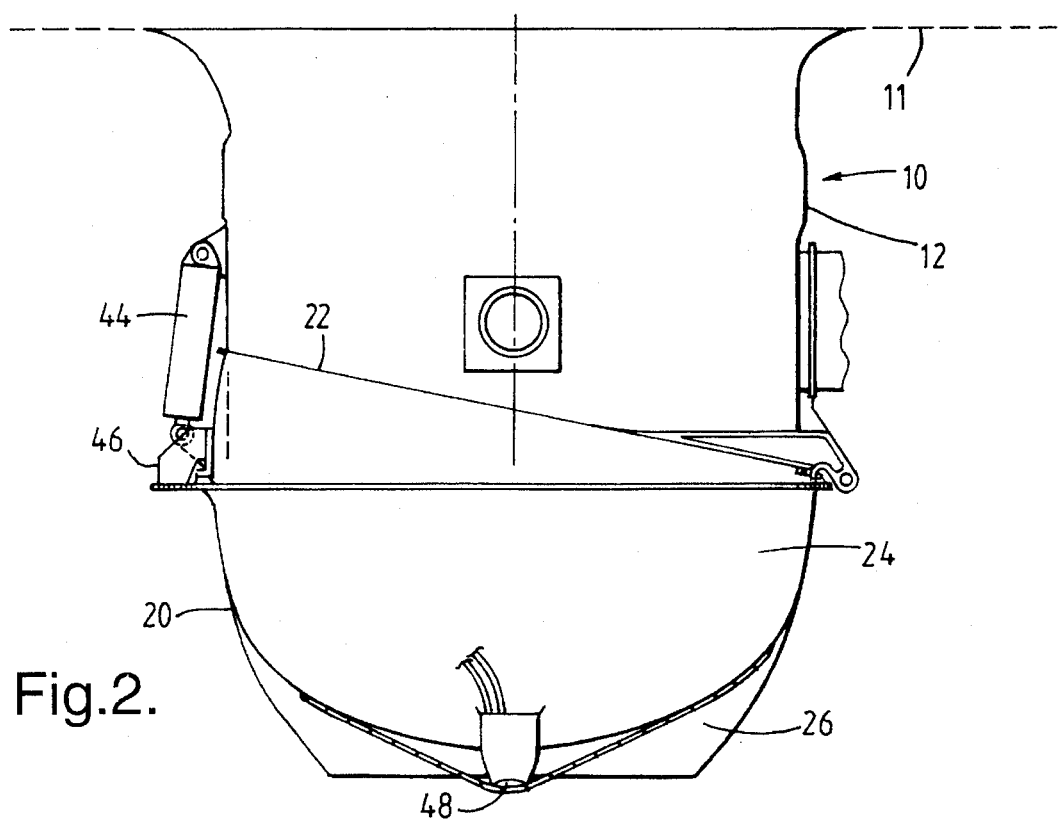
FIG. 2 is the same side view of the nozzle shown in FIG. 1 but with the nozzle in the stowed configuration.

Referring now to FIG. 2 which shows the nozzle in the vertical lift or stowed configuration. In this configuration nozzle segment 22 is fully retracted to the stowed position shown, and the corresponding scarf sections 24, 26 are aligned to define a nozzle exit plane parallel to the fan casing exit plane.

With reference now to FIG. 1 which shows the nozzle configured for maximum forward thrust. Nozzle segment 22 has been moved from its position in FIG. 2 to the position shown by energization of actuator 44, and nozzle sections 24, 26 have each been moved through 90 degrees, in opposing senses and about their respective axes, by energization of actuators 46, 48.

Obviously intermediate vector positions could be achieved simply rotating nozzle segment 22 about axis 28. It would also be possible with a nozzle of this type to vary the direction of the nozzle thrust vector in a single plane by rotating nozzle section 24, 26 at different speeds.

From the foregoing description it will be appreciated that although the nozzle of the present invention is particularly suited to airframe mounted lift fan applications, it could also be used to improve the thrust vectoring range of a conventional jet pipe mounted scarf nozzle. It will be appreciated also that the nozzle described is not restricted to use in aircraft powerplant applications but could be used in any type of fluid flow duct requiring a stowable vectorable nozzle.

I claim:

1. A vectorable nozzle, comprising at least two consecutive scarfed nozzle sections, each nozzle section rotatably mounted to an adjacent end of a neighboring nozzle section in a plane comprising adjoining ends of said at least two consecutive nozzle sections, and including an additional scarfed nozzle section mounted to a final one of the at least two consecutive nozzle sections, the additional nozzle section pivotally movable about a laterally displaced transverse axis for selective deployment to increase a vectoring range of the at least two consecutive nozzle sections.

2. A vectorable nozzle according to claim 1 in which the nozzle is mounted at the downstream end of a supply duct, and the additional nozzle section is movable telescopically over the duct.

3. A vectorable nozzle according to claim 2 in which the pivot axis of the additional nozzle section is disposed tangential to a periphery of the duct.

4. A vectorable nozzle according to claim 2 in which the additional nozzle section is a hollow part toroidal segment.

5. A vectorable nozzle as claimed in claim 4 wherein a toroidal axis of the additional nozzle section is coincident with its pivotal axis.

6. A vectorable nozzle as claimed in claim 1 further comprising actuator means for moving the additional nozzle section between a first retracted position and a second deployed position.

7. A vectorable nozzle as claimed in claim 2 in which the supply duct forms a casing of a lift fan, and the nozzle receives flow from the fan for discharge therefrom.

8. A vectorable nozzle as claimed in claim 2 in which the supply duct forms a casing of a gas turbine engine and the nozzle receives flow from the engine for discharge therefrom.

* * * * *